US 10,865,903 B2

(12) United States Patent
Vu

(10) Patent No.: US 10,865,903 B2
(45) Date of Patent: Dec. 15, 2020

(54) INTERLACE LIFTING MECHANISM

(71) Applicant: HORIBA STEC, Co., Ltd., Kyoto (JP)

(72) Inventor: Kim Ngoc Vu, Yorba Linda, CA (US)

(73) Assignee: HORIBA STEC, Co., Ltd., Kyoto (JP)

( * ) Notice: Subject to any disclaimer, the term of this patent is extended or adjusted under 35 U.S.C. 154(b) by 0 days.

(21) Appl. No.: 15/481,312

(22) Filed: Apr. 6, 2017

(65) Prior Publication Data

US 2017/0234444 A1  Aug. 17, 2017

Related U.S. Application Data

(63) Continuation of application No. 14/477,573, filed on Sep. 4, 2014, now Pat. No. 9,625,048.

(Continued)

(51) Int. Cl.
*F16K 27/02* (2006.01)
*F16K 31/00* (2006.01)
*H02N 2/04* (2006.01)

(52) U.S. Cl.
CPC .......... *F16K 27/029* (2013.01); *F16K 31/007* (2013.01); *H02N 2/043* (2013.01); *Y10T 137/7758* (2015.04); *Y10T 137/7761* (2015.04)

(58) Field of Classification Search
CPC ..... F16K 27/029; F16K 31/007; H02N 2/043; Y10T 137/7761; Y10T 137/7758
(Continued)

(56) References Cited

U.S. PATENT DOCUMENTS 4,569,504 A    2/1986  Doyle
4,695,034 A    9/1987  Shimizu et al.
(Continued)

FOREIGN PATENT DOCUMENTS

CN    1359454 A    7/2002
EP    0749058 A2    12/1996
(Continued)

OTHER PUBLICATIONS

State Intellectual Property Office of the People's Republic of China, Office Action Issued in Application No. 201480048966.0, dated May 22, 2017, 12 pages.
(Continued)

*Primary Examiner* — Umashankar Venkatesan
*Assistant Examiner* — Andrew J Rost
(74) *Attorney, Agent, or Firm* — Alleman Hall Creasman & Tuttle LLP

(57) ABSTRACT

A mechanism for coupling motion of a piezoelectric actuator in axisymmetric devices like modulating proportional valves uses actuator extension motion to cause translation away from a mechanism mounting plane and thereby enables lifting open of a valve element instead of the usual pushing closed of the valve element. The mechanism does not contain any gears nor leadscrew threads, and in usual practice is constantly loaded, so apparent change of direction is achieved without mechanical backlash introducing hysteresis. The mechanism surrounds a piezoelectric stack actuator by contacting opposite ends of the piezoelectric stack, whereby extension motion lengthening the actuator causes a lifting portion of the mechanism to translate toward the bulk of the actuator while the proximally adjacent mounting portion of the mechanism remains at a fixed location.

6 Claims, 10 Drawing Sheets

Related U.S. Application Data

(60) Provisional application No. 61/959,865, filed on Sep. 4, 2013.

(58) Field of Classification Search
USPC ..................................... 251/357, 60, 129.06
See application file for complete search history.

(56) References Cited

U.S. PATENT DOCUMENTS

| | | | |
|---|---|---|---|
| 4,784,102 | A | 11/1988 | Igashira et al. |
| 5,094,430 | A | 3/1992 | Shirai et al. |
| 5,145,147 | A | 9/1992 | Nakazawa et al. |
| 5,660,207 | A | 8/1997 | Mudd |
| 6,178,996 | B1 | 1/2001 | Suzuki |
| 6,345,803 | B2 | 2/2002 | Sakurai |
| 6,520,479 | B1 * | 2/2003 | Sato ...................... F16K 31/007 251/129.06 |
| 6,871,803 | B1 | 3/2005 | Ohmi et al. |
| 7,377,483 | B2 * | 5/2008 | Iwabuchi .................. F16K 7/16 251/331 |
| 8,162,286 | B2 | 4/2012 | Sawada et al. |
| 8,181,932 | B2 | 5/2012 | Matsumoto et al. |
| 9,280,161 | B2 | 3/2016 | Vu |
| 2004/0003786 | A1 | 1/2004 | Gatecliff et al. |
| 2004/0104367 | A1 | 6/2004 | Parsons et al. |
| 2009/0200406 | A1 | 8/2009 | Kronberger |
| 2010/0127196 | A1 | 5/2010 | Sawada et al. |
| 2010/0294964 | A1 * | 11/2010 | Matsumoto ............... F16K 7/14 251/129.01 |
| 2012/0273061 | A1 | 11/2012 | Hidaka et al. |
| 2014/0374634 | A1 | 12/2014 | Ohtsuki et al. |

FOREIGN PATENT DOCUMENTS

| | | |
|---|---|---|
| EP | 1975485 A1 | 10/2008 |
| EP | 2034047 A1 | 3/2009 |
| JP | 61149568 A | 7/1986 |
| JP | 04034275 A | 2/1992 |
| JP | H06012146 B | 2/1994 |
| JP | 08338546 A | 12/1996 |
| JP | 2000205428 A | 7/2000 |
| JP | 2003156167 A | 5/2003 |
| JP | 2004197754 A | 7/2004 |
| JP | 2007192269 A | 8/2007 |
| JP | 2008010510 A | 1/2008 |
| JP | 4119109 B | 7/2008 |
| JP | 2011117499 A | 6/2011 |
| JP | 2013100851 A | 5/2013 |
| JP | 2014190387 A | 10/2014 |

OTHER PUBLICATIONS

ISA Korean Intellectual Property Office, International Search Report and Written Opinion Issued in Application No. PCT/US2014/054090, dated Mar. 11, 2015, WIPO, 13 pages.
European Patent Office, Extended European Search Report Issued in Application No. 14842647.1, dated Feb. 23, 2017, Germany, 7 pages.
United States Patent and Trademark Office, Office Action Issued in U.S. Appl. No. 14/477,573, dated Apr. 6, 2016, 14 pages.
United States Patent and Trademark Office, Office Action Issued in U.S. Appl. No. 14/477,573, dated Jul. 21, 2016, 12 pages.
United States Patent and Trademark Office, Notice of Allowance Issued in U.S. Appl. No. 14/477,573, dated Dec. 9, 2016, 9 pages.
Japanese Patent Office, Office Action Issued in Application No. 2016540384, dated Mar. 12, 2019, 16 pages.

* cited by examiner

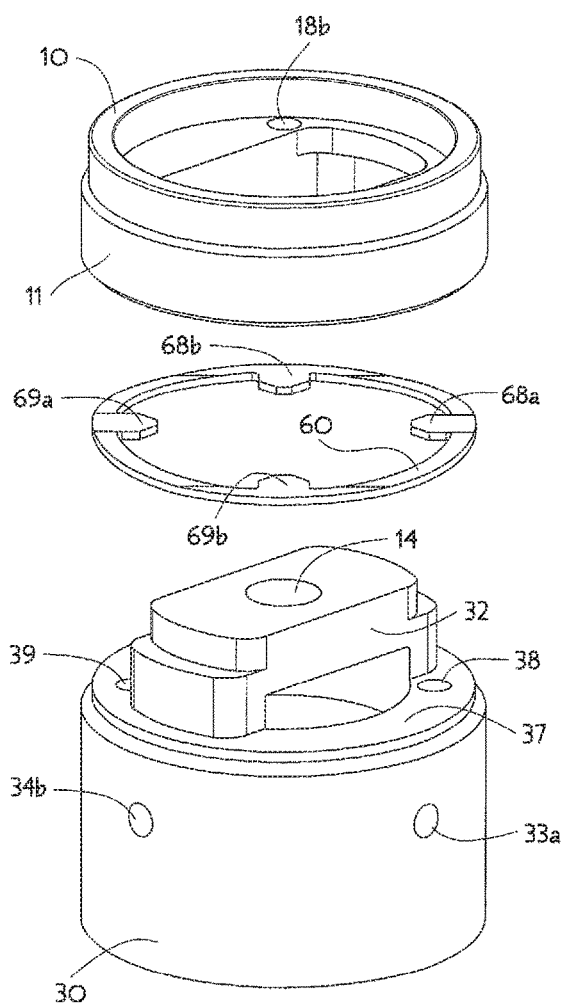
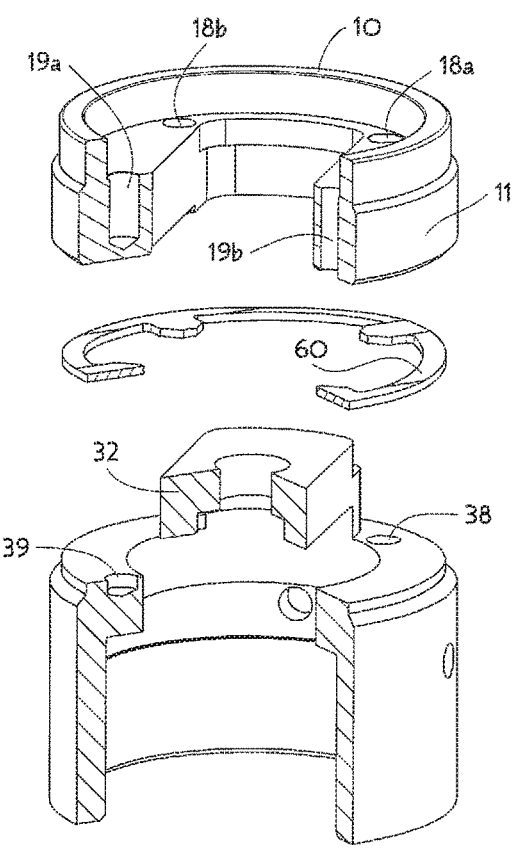
Fig. 3A
Fig. 3B
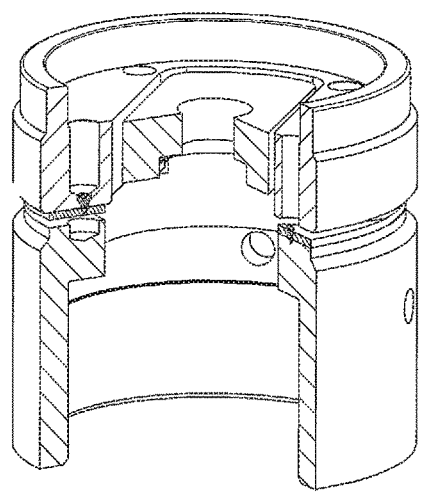
Fig. 3C

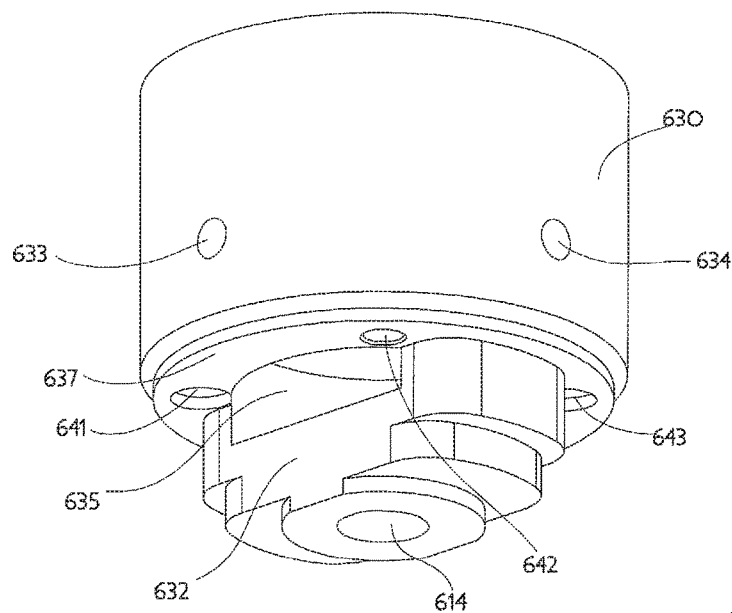
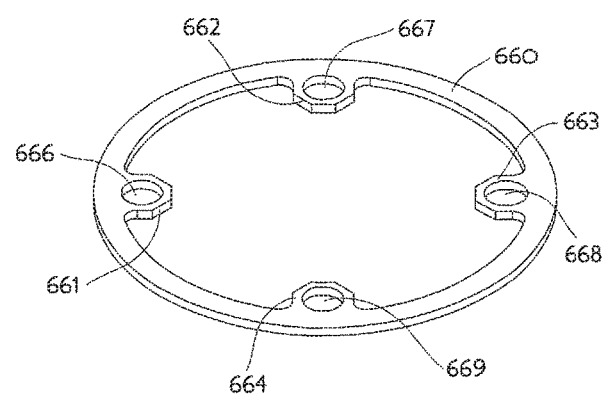
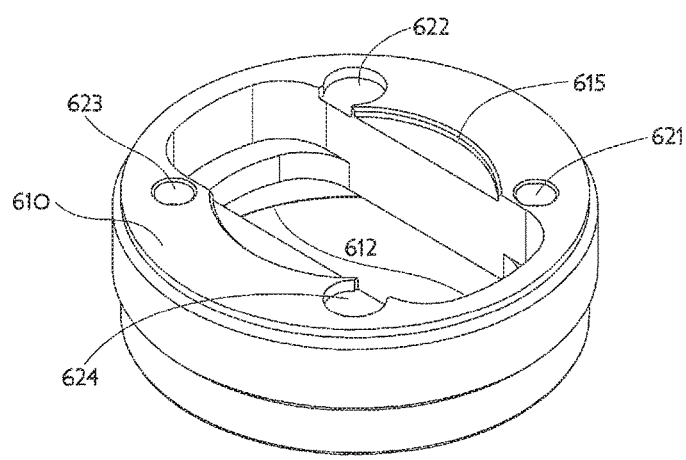
Fig. 6B
Fig. 6C
Fig. 6A

INTERLACE LIFTING MECHANISM

CROSS REFERENCE TO RELATED APPLICATIONS

This application is a continuation of U.S. patent application Ser. No. 14/477,573, entitled INTERLACE LIFTING MECHANISM, filed Sep. 4, 2014, which claims priority to Provisional U.S. Application No. 61/959,865, entitled INTERFACE LIFTING MECHANISM: MECHANISM TO CHANGE ACTUATOR FROM PUSH TO PULL IN PROPORTIONAL VALVE, filed on Sep. 4, 2013. This application is also related to U.S. patent application Ser. No. 13/794,517, entitled MULTIFLEX COUPLING, filed Mar. 11, 2013. Each of these applications is hereby incorporated by reference in its entirety for all purposes.

BACKGROUND OF THE INVENTION

The present invention is related to a mechanism for coupling motion of an actuator in axisymmetric devices like modulating proportional valves and is especially useful with regard to piezoelectric actuators. The mechanism uses actuator extension motion to cause translation away from a mechanism mounting plane and thereby enables lifting open of a valve element instead of the usual pushing closed of the valve element. The present inventive Interlace Lifting Mechanism can also be combined with the inventor's Multiflex Coupling, as disclosed in related application Ser. No. 13/794,517, already expressly incorporated by reference, in its entirety, herein, to provide increased stroke. The invention is particularly useful in valves intended for proportional, or modulating, control of fluid delivery within industrial processes making semiconductor devices, pharmaceuticals, or fine chemicals, and many similar fluid delivery systems.

The field of control valves intended for use within automated process control systems is broad and well known. Many proportional control valves have one or more movable elements that may be actively positioned, anywhere between an extreme open condition and an extreme closed condition, to adjust the flow of fluid passing therethrough. Fluid delivery apparatuses intended for manipulating process materials within semiconductor manufacturing equipment usually require attention to maintaining high purity of the delivered reactants and also are typically much smaller than valves used in petrochemical plants, for example. Nonetheless, many different types of powered valve actuators are found in high purity instrumentation and control apparatus such as mass flow controllers. U.S. Pat. No. 4,695,034 issued to Shimizu et al, describes use of a stack of piezoelectric disc elements to effect movement of valve parts in a mass flow controller. U.S. Pat. No. 4,569,504 issued to Doyle describes use of a magnetic solenoid with interleaved magnetic circuit elements. U.S. Pat. No. 5,660,207 issued to Mudd describes use of a heated resistance wire that changes length with temperature to effect valve element movement. U.S. Pat. No. 6,178,996 issued to Suzuki describes use of a pressurized fluid, such as nitrogen gas, in a bellows actuator to control the degree of opening of a diaphragm-operated control valve.

One disadvantage of both magnetic solenoid and thermal expansion type actuators is inherent constant power consumption when controlling valve elements are positioned at an intermediate condition, such as when actively regulating fluid flow. A piezoelectric actuator is effectively a capacitor in an electrical circuit, and therefore does not consume current when an applied voltage is constant. Consequently, typical piezoelectric control valve applications only require low power and avoid the undesirable generation of heat found in electromagnetic actuators. A piezoelectric actuator advantageously may produce substantially more force than a solenoid actuator of comparable size, but achievable strain severely limits the distance a piezoelectric stack can move. Valve power consumption is of particular concern in instrumentation devices such as compact mass flow controllers.

Piezoelectric actuators nearly always are used in a manner wherein applying an activation voltage causes an extensional increase in the stack length (see Shimizu et al. '034 and U.S. Pat. No. 5,094,430 to Shirai et al.). Shimizu et al. increase the available movement by interposing a force transmission member, comprising a plurality of radial lever-arm fingers, between the stack of piezoelectric disc elements and the moving portion of the control valve. These force transmission members are complicated and difficult to manufacture correctly. Piezoelectric actuators are typically associated with normally open valves wherein increasing applied voltage then causes the valve to decrease fluid flow. Normally closed valves using piezoelectric actuators, wherein increasing applied voltage then causes the valve to increase fluid flow, often have a complicated fluid flow path structure with a poppet driven by a shaft passing through the valve seat orifice (e.g. see FIG. 3 and FIG. 10 of Shimizu et al. '034) which may adversely impact fluid purity. A valve designer will benefit from having a mechanism to seemingly reverse the direction of actuator extension motion which thereby allows normally closed valves to use a piezoelectric actuator lifting a diaphragm to open the valve while avoiding the complexities and compromises of a shaft through the valve seat.

SUMMARY OF THE INVENTION

In consideration of the foregoing, the inventor has invented a mechanism that surrounds a piezoelectric stack actuator and contacts opposite ends of the piezoelectric stack, whereby extension motion (lengthening) of the actuator causes a lifting portion of the mechanism to translate toward the bulk of the actuator while the proximally adjacent mounting portion of the mechanism remains at a fixed location. The mechanism does not contain any gears nor leadscrew threads, and in usual practice is constantly loaded, so apparent change of direction is achieved without mechanical backlash introducing hysteresis. The following description may use notional directions (up and down, above and below, left and right, front and back, etc.) to assist understanding of relationships among the mechanism pieces, and illustrative drawing figures generally will match said notional directions, but it should be appreciated that an apparatus using the invention may attain any orientation in space, including actively translating or rotating or tumbling, without effect on the mechanism function.

In a typical embodiment the inventive mechanism is comprised of a mounting portion, a lifting portion, a cross-over support, and a coupling disc. The mounting portion has a central opening through which part of the lifting portion projects and the cross-over support sits against the mounting portion astride the lifting portion projection. The coupling disc functions as a resilient element uniting the mounting portion and the lifting portion, while maintaining radial and angular alignment, yet it allows axial movement of the lifting portion relative to the mounting portion and cross-over support. This over and under relationship among the fixed and moving parts of the mechanism prompts the inventor to identify his invention as an "Interlace Lifting Mechanism" for convenience of identification, but no additional significance nor limitation shall be thereby presumed.

In one embodiment 100 of an Interlace Lifting Mechanism a mounting portion may be formed as a circular mounting nut 10 with a threaded region 11 for engaging a mating thread formed in the body 99 of a fluid delivery apparatus. The mounting nut 10 is pierced axially by an oblong slot 12 and has a step feature 15 beyond the periphery of the oblong slot 12 to receive and locate a cross over plate 20. A cross over plate 20 may conveniently be a disk shape with alignment 21 and clearance 22 features on its upper and lower surfaces. A lifting portion of the one embodiment may be comprised of three parts including a lifting housing 30, an actuator housing 40, and a housing lock nut 50. The lifting housing 30 may be formed as a circular shell having an outward axially projecting traverse bar 32 of shape and dimension similar to the oblong slot 12 and extending diametrically across the open lower end 35 of the shell only partially covering the shell open lower end 35. The lifting housing 30 is connected to a coupling disc 60 and the coupling disc 60 is connected to the mounting nut 10 thereby locating the traverse bar 32 projection within the oblong slot 12. The cross over plate 20 may be positioned inside the lifting housing 30 against the partially exposed mounting nut 10 and located by the step feature 15 to be astride the traverse bar 32 axial projection and oblong slot 12.

In the embodiment 100 of an Interlace Lifting Mechanism a lower end 91 of an actuator 90 may be coupled against the cross over plate 20. The actuator housing 40 may be formed as a circular tube shape having threads 41 to engage mating threads 31 formed on the lifting housing 30 and an inward directed lip 45 may be formed on the upper end of the actuator housing 40 to contact the upper end 95 of the actuator 90. Engagement between the actuator housing 40 and the lifting housing 30 may thus be adjusted until the actuator 90 is properly captured between the cross over plate 20 and the lip 45. The housing lock nut 50 may then be used to prevent unintended changes of this engagement. An actuator preload spring 88 may be located between an inward lip 37 at the lower end of the lifting housing 30 and the lower end 91 of the actuator 90 to provide static compression of the actuator. Such preload spring 88 is particularly useful in the application of piezoelectric stack actuators. Applying an activation voltage to the piezoelectric stack causes an extensional increase in the actuator length that translates the actuator housing 40 away from the cross over plate 20 which rests upon the mounting nut 10, and thereby moves the lifting housing 30 with its traverse bar 32 relative to the mounting nut 10 while deflecting the coupling disc 60. A fluid driven actuator of hermetic design (without sliding seals) such as a hydraulic bellows may also be considered for use with the one embodiment 100 of an Interlace Lifting Mechanism.

It should be appreciated that a circular cross-section is chosen for the axisymmetric lifting housing 30 and actuator housing 40 merely for convenience, while an open frame type (typically but not solely bilaterally symmetric) structure would also suffice. In the situation of an open frame, a rectangular structure may surround a piezoelectric stack similar to a picture frame with the bottom of the frame comprising the lifting portion of the mechanism. It should also be appreciated that a flange may be used for attachment of the mounting portion of the mechanism and threaded fasteners, or other attachment methods such as welding or adhesives, can be used to secure the mechanism to a fluid delivery apparatus body 99.

Another embodiment 500 of an Interlace Lifting Mechanism is constructed with a Multiflex Coupling, as described in detail within U.S. patent application Ser. No. 13/794,517, placed in series with a piezoelectric stack actuator within the inventive mechanism. A mounting portion of this other embodiment may be formed as a circular mounting nut 510 with a threaded region 511 for engaging a mating thread formed in the body 599 of a fluid delivery apparatus. The mounting nut 510 is pierced axially by an oblong slot 512 and has a step feature 515 beyond the periphery of the oblong slot 512 to receive and locate a cross over plate 520. A cross over plate 520 may conveniently be a disk shape with alignment 521 and clearance 522 features on its upper and lower surfaces. A lifting portion of this other embodiment may be comprised of four parts including a lifting housing 530, a Multiflex Coupling assembly, an actuator housing 540, and a housing lock nut 550. The lifting housing 530 may be formed as a circular shell having an outward axially projecting traverse bar 532 of shape and dimension similar to the oblong slot 512 and extending diametrically across the open lower end of the shell only partially covering the shell open lower end. The lifting housing 530 is connected to a coupling disc 560 and the coupling disc 560 is connected to the mounting nut 510 thereby locating the traverse bar 532 projection within the oblong slot 512. The cross over plate 520 may be positioned inside the lifting housing 530 against the partially exposed mounting nut 510 and located by the step feature 515 to be astride the traverse bar 532 axial projection and oblong slot 512.

In this other embodiment 500, a Multiflex Coupling is placed in contact with the cross over plate 520 and also engaged with the lifting housing 530. A threaded post feature 521 on the upper surface of the cross over plate 520 may conveniently fit into a mating threaded hole 579 in the lower reactive element 578 portion of the Multiflex Coupling. The upper passive element 575 portion of the Multiflex Coupling may be held against a shoulder 535 of the lifting housing 530 by a locking ring 584 (or other means such as threads, pins, crimping, or welding) whereby the passive element 575 and lifting housing 530 remain in located contact with each other and move in unison. A preload spring 588 between the cross over plate 520 and the Multiflex Coupling reactive element 578 provides force which is additional to that resulting from the mere zero clearance adjustment of the mechanism elements and is particularly useful with piezoelectric actuator stacks.

In this other embodiment 500 of an Interlace Lifting Mechanism the lower end 591 of an actuator 590 may be placed in contact with the upper active shaft element 580 portion of the Multiflex Coupling. The actuator housing 540 may be formed as a circular tube shape having threads 541 to engage mating threads 531 formed on the lifting housing 530 and a top capping end 545 may be formed on the upper end of the actuator housing 540 to contact the upper end 595 of the actuator 590. Engagement between the actuator housing 540 and the lifting housing 530 may thus be adjusted until the actuator 590 is properly captured between the Multiflex Coupling and the top capping end 545. The housing lock 550 nut may then be used to prevent unintended changes of this engagement. Applying an activation voltage causes an extensional increase in the actuator stack length that translates the actuator housing 540 away from the active shaft element 580 which is connected to the pivot pin 582 within the Multiflex Coupling. The actuator housing 540 being in fixed engagement with the lifting housing 530, in combination with the lifting housing 530 being in located contact with the passive element 575, causes the passive element 575 to move relatively away from the active shaft 580 and pivot pin 582. Relative motion between the pivot pin 582 and passive element 575 causes the rockers 576, 577 to tip slightly and thereby increase the distance between the reactive element 578 and the passive element 575 by an amount defined by the mechanical gain of the Multiflex Coupling and the actuator extensional length increase. The passive element 575 being in located contact with the lifting housing 530, while the reactive element 578 contacts the cross over plate 520 resting against the mounting nut 510, thus moves the lifting housing 530 with its traverse bar 532 relative to the mounting nut 510 while deflecting the coupling disc 560.

In one particular aspect of the invention, there is provided a mechanism for coupling motion of an actuator, the mechanism being adapted to surround the actuator and to contact opposite ends of the actuator, whereby an extension motion lengthening the actuator causes a lifting portion of the mechanism to translate toward a bulkier portion of the actuator while a proximally adjacent mounting portion of the mechanism remains at a fixed location. This mechanism is axisymmetric. The actuator may be a piezoelectric stack actuator. An actuator preload spring provides a compressive force against the actuator which is independent from valve closing forces. A coupling is interposed between the actuator and the mounting portion of the mechanism for increasing a stroke of the actuator. An actuator spring provides a compressive force against the actuator which is independent from valve closing forces. The axisymmetric mechanism comprises a modulating proportional valve.

In another aspect of the invention, there is provided a mechanism used for lifting a valve actuator which is powered by a piezoelectric stack. The mechanism comprises a mounting portion, a lifting portion, a cross-over support, and a coupling disc. The mounting portion comprises a mounting nut. The mounting nut is threaded for connection to a valve body. A shutoff spring is positioned by the mounting portion. In certain embodiments, the shutoff spring comprises a Belleville spring washer. The cross-over support comprises a cross-over plate. The lifting portion comprises a lifting housing, an actuator housing, and a housing lock nut. The coupling disc comprises a substantially flat ring fabricated from a resilient material having spring-like characteristics.

The invention, together with additional features and advantages thereof, may best be understood by reference to the following description taken in conjunction with the accompanying illustrative drawings.

BRIEF DESCRIPTION OF DRAWINGS

FIG. 3A is an exploded view of the inverted stack of lifting housing, coupling disc, and mounting nut of the present invention;

FIG. 3B is an exploded view like that of FIG. 3A with a quarter segment section removed to reveal the relationship of weld enabling features;

FIG. 3C is a cross-sectional view of the apparatus of FIG. 3B, fully assembled with welds indicated;

FIG. 6A is a perspective view of an alternative mounting nut;

FIG. 6B is a perspective view of an alternative lifting housing;

FIG. 6C is a perspective view of an alternative coupling disc;

DETAILED DESCRIPTION

Figure 1A:
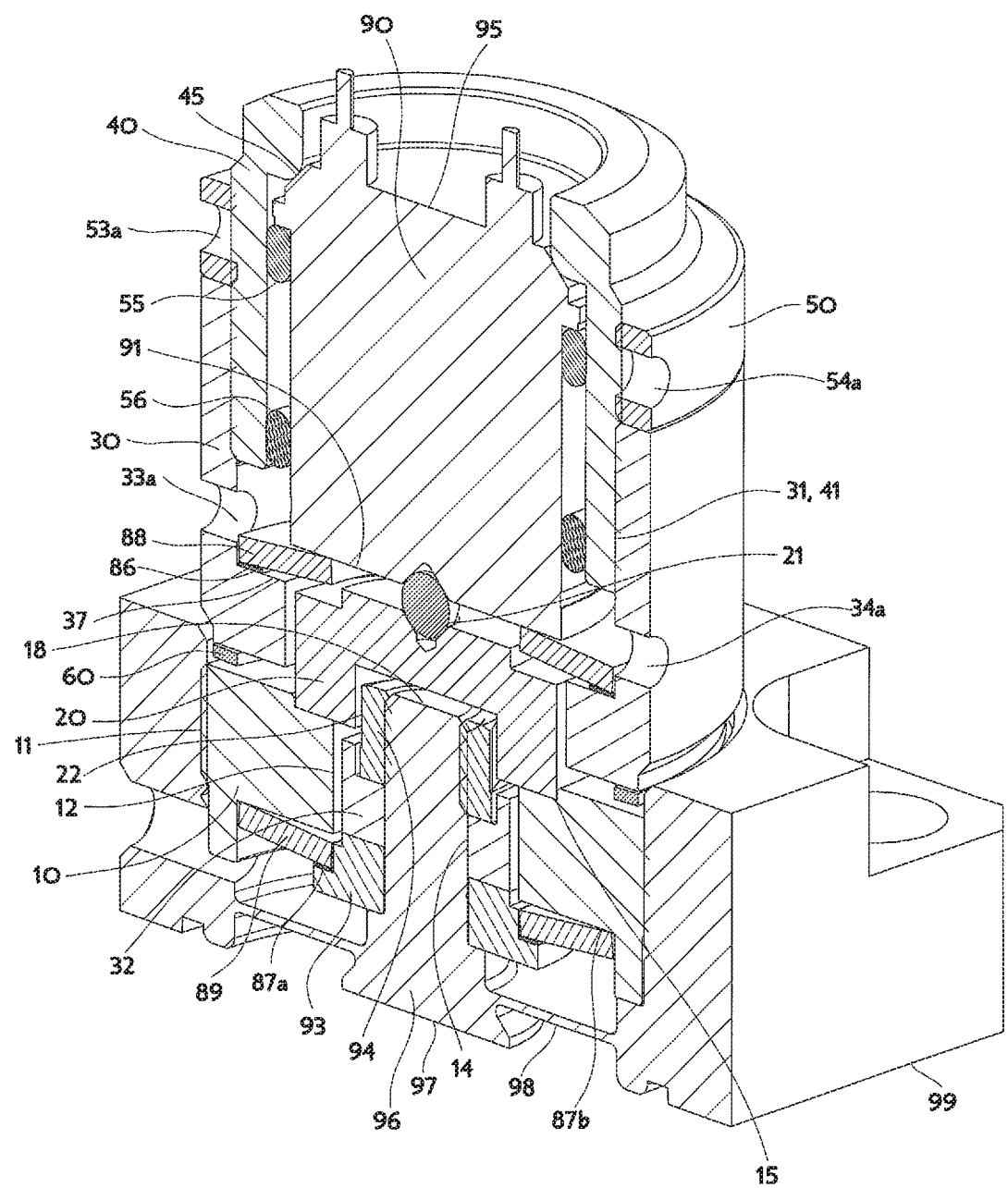
FIG. 1A is a cross-sectional view of one embodiment of an interlace Lifting Mechanism cut axially across the oblong slot, and traverse bar, also showing the cross over plate sitting atop the mounting nut.

This invention is not limited in its application to the details of construction and the arrangement of components set forth in the following description or illustrated in the drawings. The invention is capable of other embodiments and of being practiced or of being carried out in various ways. Also, the phrasing and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 1B:
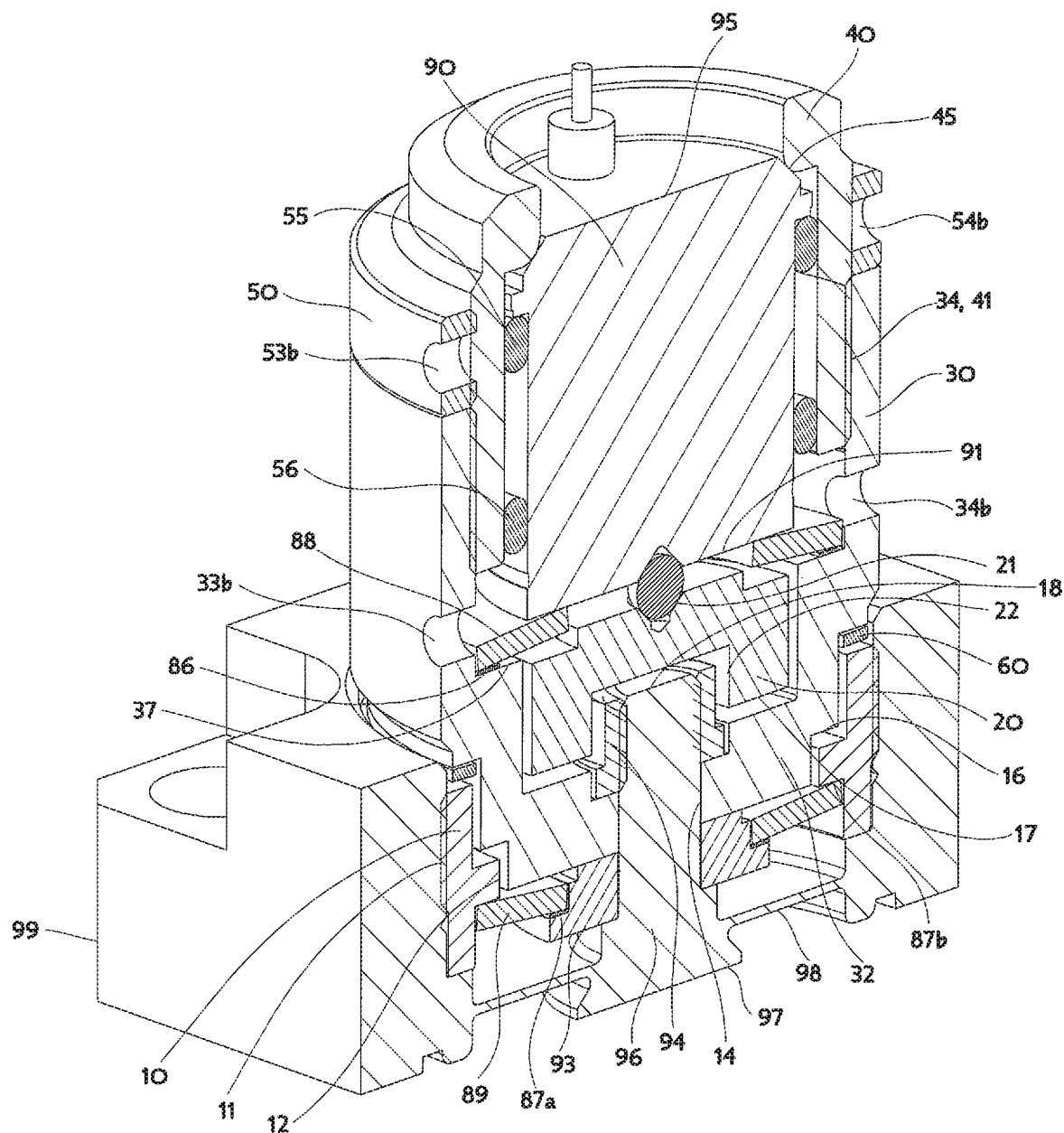
FIG. 1B is a cross-sectional view of the embodiment of FIG. 1, cut axially along the oblong slot and showing the traverse bar passing under the cross over plate (section is perpendicular to that of FIG. 1A)
Figure 2A:
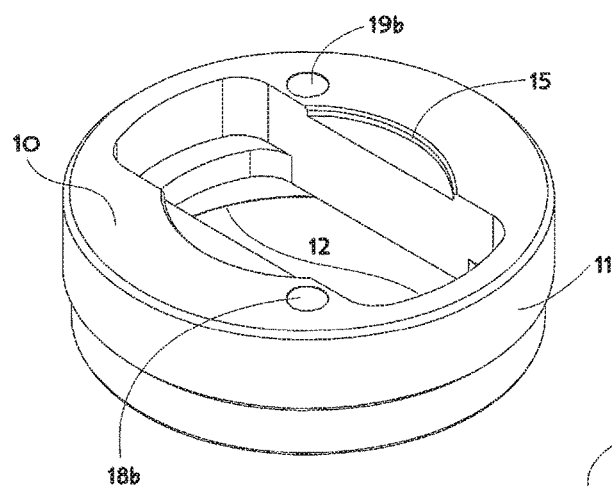
FIG. 2A is a perspective view of a mounting nut for the inventive apparatus.

Referring now more particularly to the drawings, a representative example of an Interlace Lifting Mechanism 100 may be affixed to a body 99 of a typical fluid delivery apparatus as illustrated in the assembly cross sectional views of FIG. 1A and FIG. 1B. The fluid delivery apparatus may include a valve structure comprising a flow modulating element 97 movable by lifting a central shaft 96 and flexing a diaphragm 98 by action of the Interlace Lifting Mechanism 100. The contemplated fluid delivery apparatus may be an active subsystem such as, for example, a mass flow controller or more simply an individual modulating valve. In fluid delivery equipment intended for semiconductor manufacturing, the valve body 99 will typically be made from high purity 316L stainless steel alloy, Hastelloy® C22® nickel alloy, or similar materials. The interlace Lifting Mechanism 100 may have a mounting portion formed as a circular mounting nut 10 with a threaded region 11 for engaging a mating thread formed in the body 99 of the valve. FIG. 2A is a perspective view of the mounting nut 10 showing the described features. The mounting nut 10 may be made from a material similar to the apparatus body 99 or other more easily machined material because it is outside the fluid flow path and not in contact with delivered chemistries for which purity is an overarching consideration. An exterior threaded region 11 may function to secure the mounting nut 10 within the valve body 99. It should be appreciated that a skilled designer may alternatively use a flange and threaded fasteners, or other attachment methods such as welding or adhesives, to secure the mounting nut 10 to the apparatus body 99.

The mounting nut 10 may also axially position a shutoff spring 89 used to provide valve closing force which urges the movable flow modulating element 97 in the flow stopping direction. Such a spring provides valve closing force which is additional to the simple flexural characteristics of the valve diaphragm 98. In one particular convenient implementation, the shutoff spring 89 may comprise a Belleville spring washer interposed between the mounting nut 10 and a thrust bushing 93, which rides on the central shaft 96 to impart valve closing force to the diaphragm 98 and the flow modulating element 97. One or more shims 87a may optionally be placed between the shutoff spring 89 and the thrust bushing 93 for purposes of finely adjusting the added valve closing force, and additional shims 87b may also function as a hardened bearing surface for the shutoff spring 89 to push against the mounting nut 10.

The mounting nut 10 is pierced axially by an oblong slot 12 and has on its upper surface a step feature 15 beyond the periphery of the oblong slot 12 to receive and locate a cross-over plate 20. The cross-over plate 20 may conveniently be a disk shape with alignment and clearance features on its upper and lower surfaces. FIG. 1A is a cross-section of the representative embodiment 100 of an Interlace Lifting Mechanism, cut perpendicularly to the oblong slot 12, and a traverse bar 32 described further below, thereby showing the cross-over plate 20 sitting atop the mounting nut 10. An alignment feature on the upper surface of the cross over plate 20 may be formed as a conical receptacle 21 and associated spherical bearing (or alternatively a hemispherical tipped load concentration pin) to mate with a suitable conical or similar concavity on a lower end 91 of an actuator 90 to accommodate minor actuator misalignment. A clearance feature on the lower surface of the cross-over plate 20 may be formed as a circular relief 22 to prevent interference with the coupling of the Interlace Lifting Mechanism 100 to movable elements of the valve, such as the central shaft 96 and associated retaining nut 94. The cross-over plate 20 may be made from a heat treatable material such as 17-4PH steel, for example. Placement of the cross-over plate 20 is further described below.

Figure 2B:
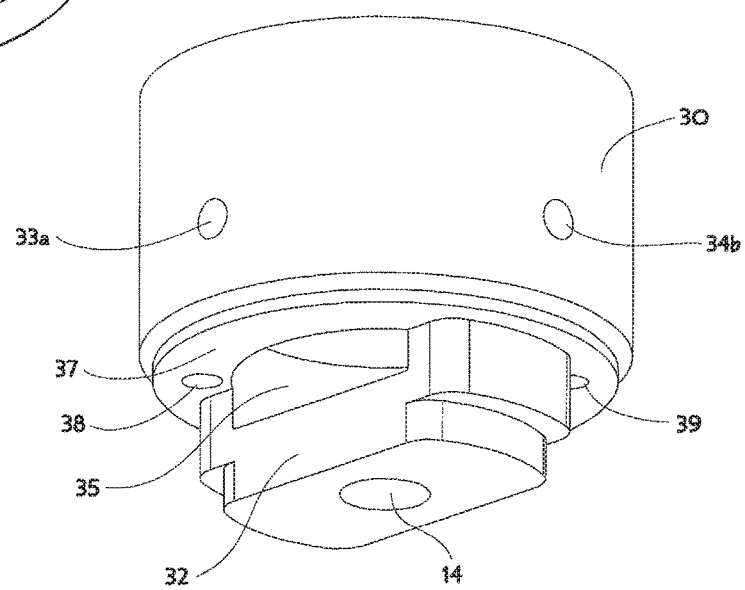
FIG. 2B is a perspective view of a lifting housing of the present invention.

A lifting portion of the illustrated embodiment may be comprised of three parts, including a lifting housing 30, an actuator housing 40, and a housing lock nut 50. The lifting housing 30 (as illustrated in FIGS. 1A & 1B, and detailed in FIG. 2B) may be formed as a circular shell having the aforementioned outward axially projecting traverse bar 32 of shape and dimension similar to the mounting nut oblong slot 12 and extending diametrically across an open lower end 35 of the shell, but only partially covering the shell open lower end 35. A stern hole 14 may be provided in the traverse bar 32 to facilitate linkage with the moveable portion of the valve such as the central shaft 96. The open lower end 35 of the shell may optionally include a lip 37 for convenience in making the shell and traverse bar from a single piece of material. In the case of a lifting housing which includes a lip 37, there may be one or more (typically two diametrically opposite) reliefs or axial penetrations 38, 39 cut into the lip 37, thereby providing weld clearance when attaching to a coupling disc 60 as described further below. Additionally, the lip 37 may also axially position a preload spring 88 used to provide compressive preload to the actuator 90. The preload spring 88 is particularly useful in the application of piezoelectric stack actuators by providing actuator compressing force which is additional to that resulting from the mere zero-clearance adjustment of the mechanism elements. A convenient implementation may comprise the aforementioned Belleville spring washer 88 interposed between the lip 37 and the lower end 91 of the piezoelectric stack actuator 90. One or more shims 86 may optionally be placed between the preload spring 88 and the lip 37 for purposes of finely adjusting the added actuator compressing force, and these shims may also function as a hardened bearing surface for the preload spring 88 to push against. The circular shell of the lifting housing 30 may have one or more inward radial penetrations 33a, 34a, 33b, 34b (passing either partially or fully through the shell wall) that serve as points of engagement for a spanner wrench to help assemble the mechanism. The circular shell may include a threaded region 31 near the upper end for engagement of the actuator housing 40 as also described further below.

Figure 2C:
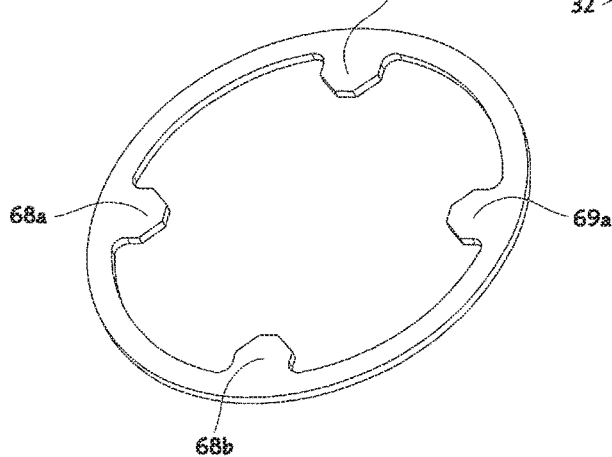
FIG. 2C is a perspective view of a coupling disc of the present invention.
Figure 4C:
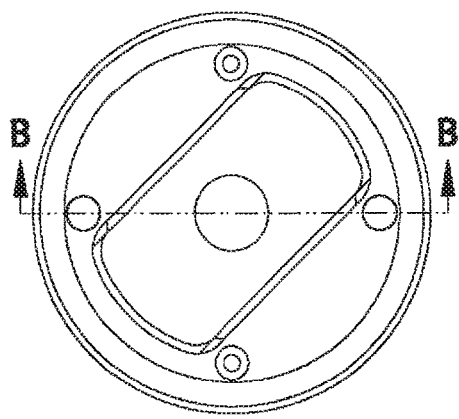
FIG. 4C is a top view of the apparatus shown in FIGS. 4A and 4B.
Figure 4A:
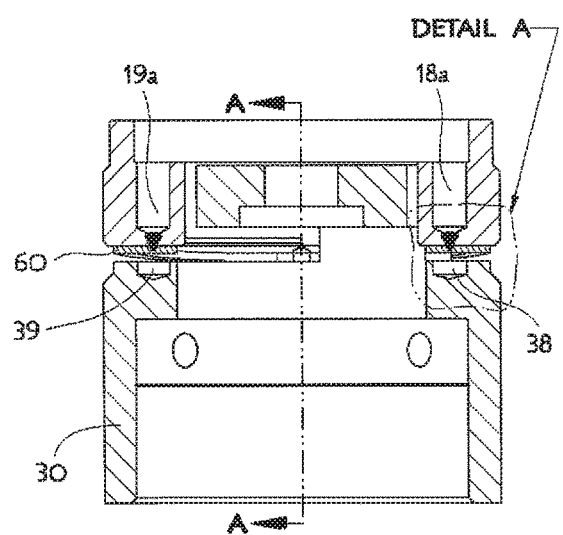
FIG. 4A is a cross-sectional view through the inverted stack of lifting housing, coupling disc, and mounting nut, taken along lines B-B of FIG. 4C, showing the weld attachment of the coupling disc and mounting nut.
Figure 4B:
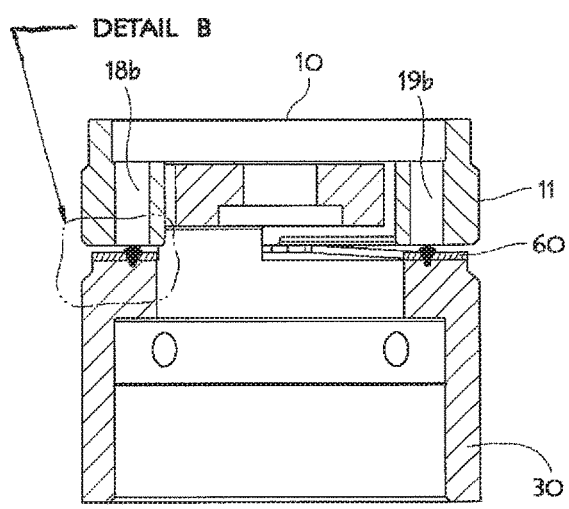
FIG. 4B is a cross-sectional view through the inverted stack of lifting housing, coupling disc, and mounting nut, taken along lines A-A of FIG. 4A, showing the weld attachment of the coupling disc and lifting housing.
Figure 4D:
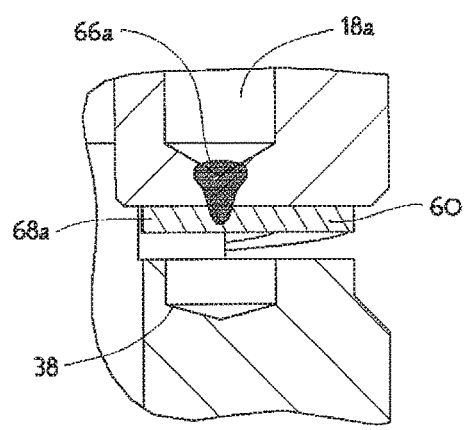
FIG. 4D is an enlarged cross-sectional view of the portion of FIG. 4A identified as DETAIL A.
Figure 4E:
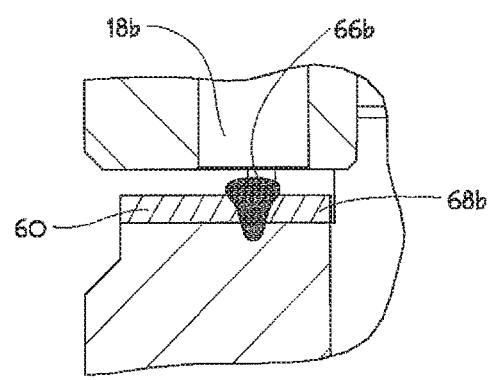
FIG. 4E is an enlarged cross-sectional view of the portion of FIG. 4B identified as DETAIL B.

The lifting housing 30 is connected to the coupling disc 60 (as illustrated in FIGS. 1A & 1B, and detailed in FIG. 2C) and the coupling disc 60 is connected to the mounting nut 10, thereby locating the traverse bar 32 projection within the oblong slot 12. The coupling disc 60 may be formed as a flat ring shape with radially directed (inward directed being more convenient but not limiting for the representative embodiment 100) diametrically opposite tabs 68a, 69a, 68b, 69b as illustrated in FIG. 2C and made from a material suitable for use as a spring, such as 17-4PH steel for example, while being compatible with connecting to the lifting housing 30 and connecting to the mounting nut 10. A convenient method of making these connections is by welding. In a typical manufacturing sequence the lifting housing shell 30, the coupling disc 60, and the mounting nut 10 are inverted and stacked in angular alignment as illustrated in FIGS. 3A, 3B, & 3C. Weld forming energy, such as laser light or an electron beam, is directed into blind reliefs 18a, 19a in the underside of the mounting nut 10 to create welds 66a, 67a connecting the mounting nut 10 and coupling disc tabs 68a, 69a as illustrated in FIG. 4A. During the same set-up, weld-forming energy may be directed through holes 18b, 19b through the mounting nut 10 to create welds 66b, 67b connecting the coupling disc tabs 68b, 69b to the lifting housing 30 as illustrated in FIG. 4B. Threaded fasteners commensurate with dimensions of a particular Interlace Lifting Mechanism implementation may be used as an alternative to welding.

An alternative design using interference fit pins to connect a lifting housing to a coupling disc and the coupling disc to a mounting nut is described further below in conjunction with FIGS. 6A-8E. The symmetry of the coupling disc 60, sandwiched between and secured to the lifting housing 30 and mounting nut 10, functions as a balanced pair of leaf springs allowing relative axial movement of the housing and nut while maintaining correct angular and radial location of the traverse bar 32 within the oblong slot 12.

The actuator housing 40 in the embodiment 100 may be formed as a circular tube shape having threads 41 to engage mating threads in the threaded region 31 formed on the lifting housing 30 and an inwardly directed lip 45 may be formed on the upper end of the actuator housing 40 to contact an upper end 95 of the actuator 90. Engagement between the actuator housing 40 and the lifting housing 30 may thus be adjusted until the actuator 90 is properly captured between the cross-over plate 20 and the lip 45. The ring-shaped housing lock nut 50 may then be used to prevent unintended changes of this engagement. The housing lock nut 50 may have one or more inward radial penetrations 53a, 54a, 53b, 54b (passing either partially or fully through the ring wall) that serve as points of engagement fur a spanner wrench to help assemble the mechanism. A simple sliding fit between the actuator housing 40 and the lifting housing 30 may be used as an alternative to threads 31, 41 along with other locking means such as pins, crimping, adhesives, or welding which are also contemplated. The actuator housing 30 may be made from materials having a chosen low coefficient of thermal expansion, such as Invar alloys or Molybdenum metal, in applications having potentially problematic temperature variations. One or more annular elastomeric elements 55, 56 such as O-rings may be placed between the actuator periphery and the actuator housing interior to assist with assembly, handling, and mounting.

The cross-over plate 20 may be positioned inside the lifting housing 30 against the partially exposed mounting nut 10 and located by the step feature 15 to be astride the axial projection and oblong slot 12 of the traverse bar 32. In embodiment 100, the lower end 91 of the piezoelectric stack actuator 90 may be coupled against the cross-over plate 20 by use of a hard spherical ball engaging the conical alignment feature 21. Applying an activation voltage causes an extensional increase in the actuator stack length that translates the actuator housing 40 away from the cross-over plate 20, which rests upon the mounting nut 10, and thereby moves the lifting housing 30 with its traverse bar 32 relative to the mounting nut 10 while deflecting the coupling disc 60. This motion may be observed as a decrease of a clearance 18 between the retaining nut 94 and a cross-over plate clearance feature 22, a decrease of a clearance 17 between the top of the traverse bar 32 and the bottom of the cross-over plate 20, and an increase of a clearance 16 between the bottom of the traverse bar 32 and the mounting nut 10 as illustrated in FIG. 1B.

Figure 5A:
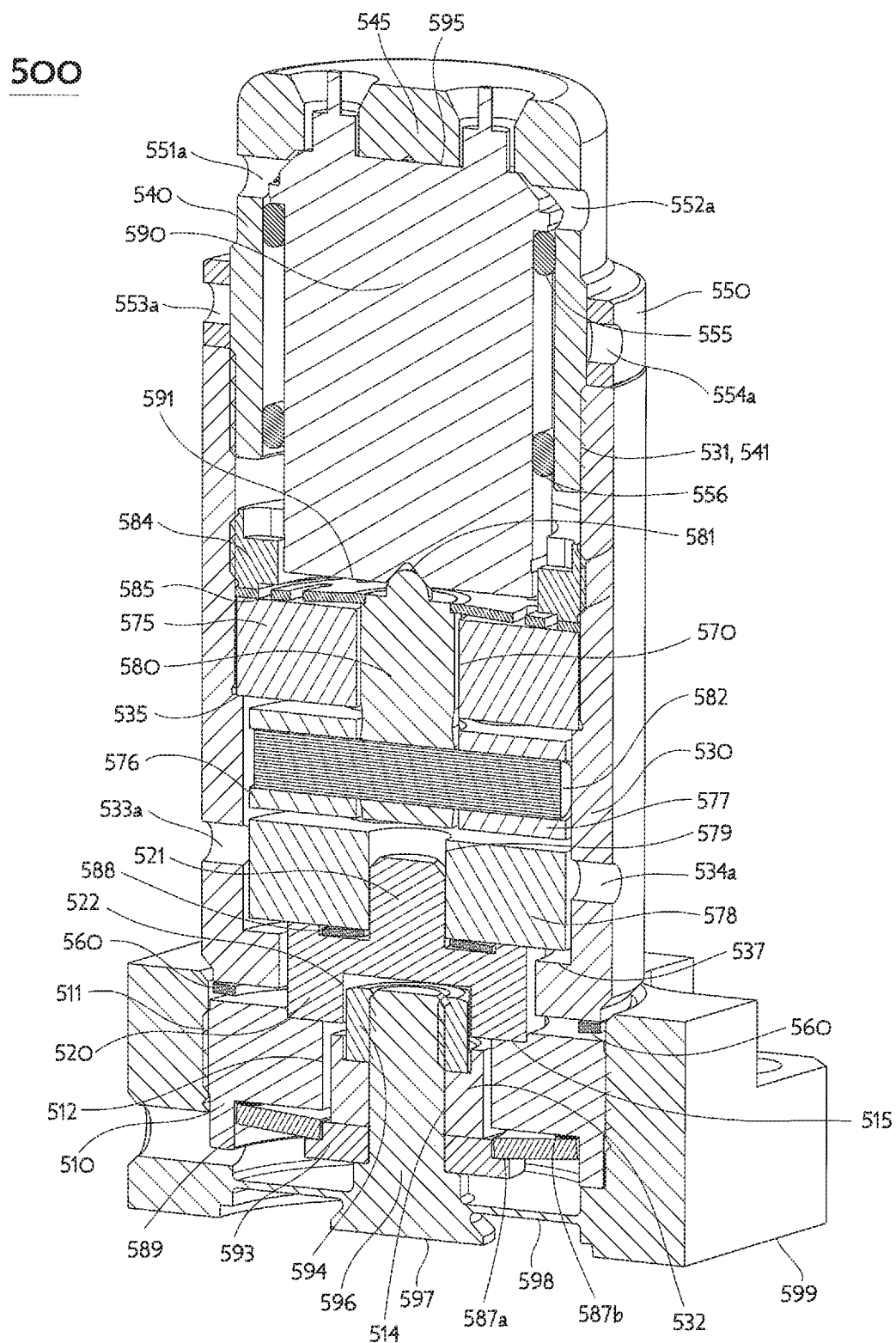
FIG. 5A is a cross-sectional view of another embodiment of an Interlace Lifting Mechanism constructed in accordance with the principles of the present invention, wherein the mechanism is cut perpendicular to the oblong slot and traverse bar while also being parallel to the pivot pin of the incorporated Multiflex Coupling assembly and thus sectioning both rockers.
Figure 5B:
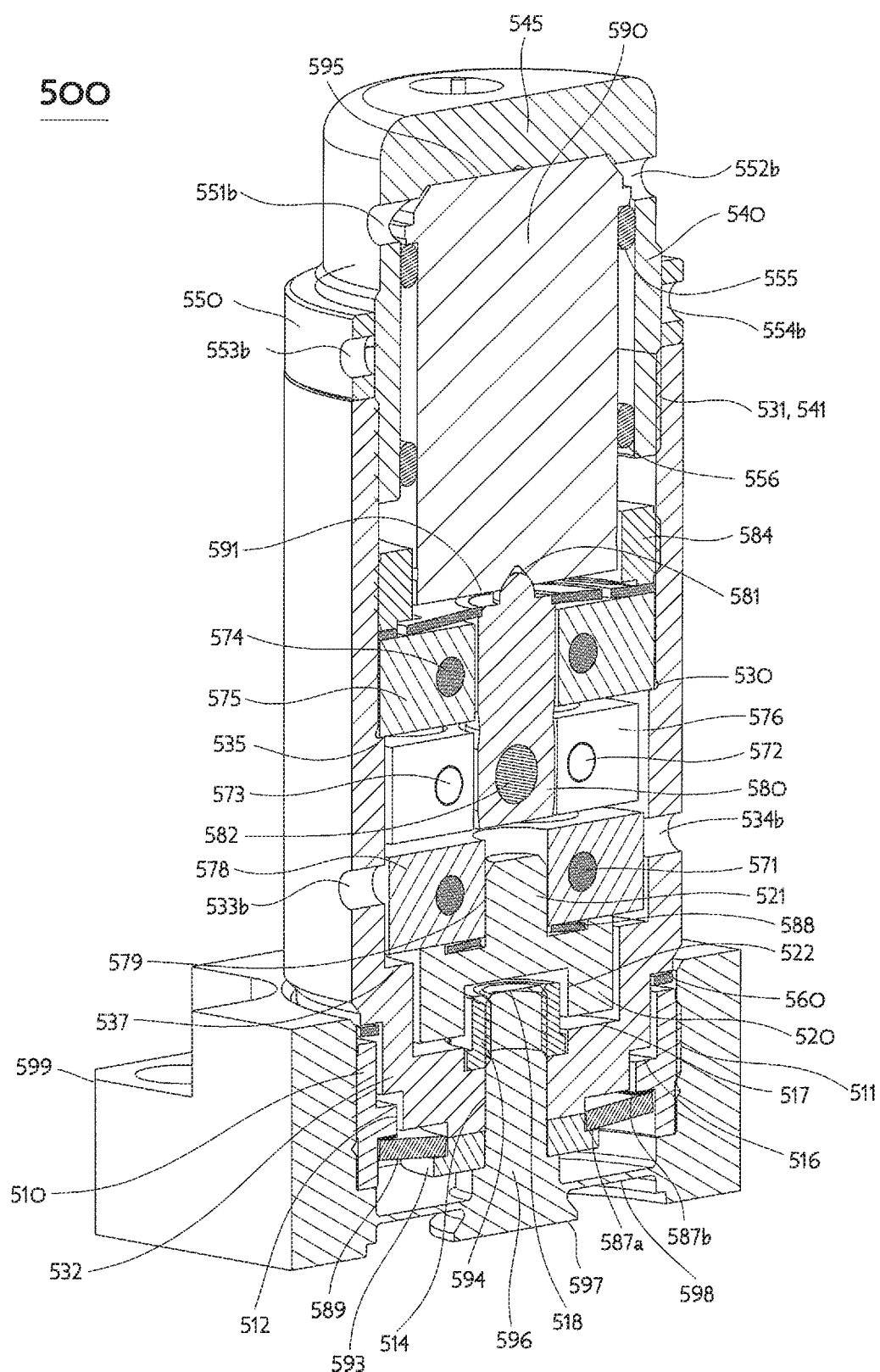
FIG. 5B is a cross-sectional view of the embodiment of FIG. 5A, wherein the mechanism is cut parallel to the oblong slot and traverse bar while revealing one rocker of the Multiflex Coupling assembly.

The aforementioned alternative embodiment 500 of an Interlace Lifting Mechanism is constructed with a Multiflex Coupling, as described in detail within U.S. patent application Ser. No. 13/794,517, placed in series with an actuator within the inventive Interlace Lifting Mechanism. This alternative example of an Interlace Lifting Mechanism 500 may be ffixed to a body 599 of a typical fluid delivery apparatus as illustrated in the assembly cross-sectional views of FIGS. 5A & 5B. The fluid delivery apparatus may include a valve structure comprising a flow modulating element 597 movable by lifting a central shaft 596 and flexing a diaphragm 598 by action of the Interlace Lifting Mechanism 500. The actuator may typically be a piezoelectric stack type actuator, but other high-force, low-strain devices (e.g. magnetostrictive elements) might also benefit from the stroke multiplication afforded by the Multiflex Coupling. In fluid delivery equipment intended for semiconductor manufacturing, the apparatus body 599 will typically be made from high purity 316L stainless steel alloy, Hastelloy® C22® nickel alloy, or similar materials. The apparatus 500 may have a mounting portion formed as a circular mounting nut 510 (as illustrated in FIGS. 5A & 5B) with a threaded region 511 for engaging a mating thread formed in the body 599 of the apparatus. The mounting nut 510 may be made from a material similar to the apparatus body 599 or other more easily machined material, because it is outside the fluid flow path and not in contact with delivered chemistries for which purity is an overarching consideration. An exterior threaded region 511 may function to secure the mounting nut 510 within the apparatus body 599, while it should be appreciated that a skilled designer may alternatively use a flange and threaded fasteners, or other attachment methods such as welding or adhesives, to secure the mounting nut 510 to the fluid delivery apparatus body 599.

The mounting nut 510 may also axially position a shutoff spring 589 used to provide valve closing force, which urges the movable flow modulating element 597 in the flow stopping direction. Such shutoff spring provides valve closing force which is additional to the simple flexural characteristics of the valve diaphragm 598. In one convenient implementation, the shutoff spring 589 may comprise a Belleville spring washer interposed between the mounting nut 510 and a thrust bushing 593, which rides on the central shaft 596 to impart a valve closing force to the diaphragm 598 and flow modulating element 597. One or more shims 587a may optionally be placed between the shutoff spring 589 and the thrust bushing 593 for purposes of finely adjusting the added valve closing force, and additional shims 587b may also function as a hardened bearing surface for the shutoff spring 589 to push against the mounting nut 510.

The mounting nut 510 is pierced axially by an oblong slot 512 and has on its upper surface a step feature 515 beyond the periphery of the oblong slot 512 to receive and locate a cross-over plate 520. The cross-over plate 520 (shown sectioned in FIGS. 5A & 5B) may conveniently be a disk shape with alignment and clearance features on its upper and lower surfaces. An alignment feature on the upper surface of the cross over plate 520 may be formed as a post 521, which may conveniently fit into a mating hole 579 in the lower reactive element 578 portion of the Multitlex Coupling (post 521 and mating hole 579 may additionally be actively coupled by mating threads when desired). A clearance feature on the lower surface of the cross over plate 520 may be formed as a circular relief 522 to prevent interference with means for coupling the mechanism 500 to movable elements of the valve, such as the central shaft 596 and associated retaining nut 594. The cross-over plate 520 may be made from a heat treatable material such as 17-4PH steel, for example. Placement of the cross-over plate 520 is further described below.

A lifting portion of this alternative embodiment may be comprised of four parts including a Multifiex Coupling, a lifting housing 530, an actuator housing 540, and a housing lock nut 550. The lifting housing 530 (as illustrated in FIGS. 5A & 5B) may be formed as a circular shell having an outward axially projecting traverse bar 532 of shape and dimension similar to the mounting nut oblong slot 512 and extending diametrically across the open lower end of the shell only partially covering the shell open lower end. A stem hole 514 may be provided in the traverse bar 532 to facilitate linkage with the moveable portion of the valve such as the central shaft 596. The open lower end of the shell may optionally include a lip 537 for convenience in making the shell and traverse bar. In the case of a lifting housing which includes a lip 537 there may be one or more (typically two diametrically opposite) reliefs and axial penetrations cut into the lip 537 for pins used to attach the coupling disc 560 as described further below. The circular shell of the lifting housing 530 may have one or more inward radial penetrations 533a, 534a, 533b, 534b (passing either partially or fully through the shell wall) that serve as points of engagement for a spanner wrench to help assemble the mechanism. The circular shell may include a threaded region 531 near the upper end for engagement of the actuator housing 540 as also described further below.

The lifting housing 530 is connected to a coupling disc 560 (as illustrated in FIGS. 5A & 5B), and the coupling disc 560 is connected to the mounting nut 510, thereby locating the traverse bar 532 projection within the oblong slot 512. The coupling disc 560 may be formed as a flat ring shape with radially directed diametrically opposite tabs (inwardly directed being more convenient but not limiting for the representative embodiment 500), as illustrated in the example of FIG. 6C and made from a material suitable for use as a spring, such as 17-4PH steel for example, while being compatible with connecting to the lifting housing 530 and connecting to the mounting nut 510. A convenient method of making these connections is by using interference fit pins 671, 672, 673, 674 to connect the lifting housing 530 to the coupling disc 560 and the coupling disc 560 to the mounting nut 510, and is described and illustrated further below in conjunction with FIGS. 6A-6C, FIGS. 7A-7C, and FIGS. 8A-8E. An alternative design may use welding in a manner similar to that previously described for the Interlace Lifting Mechanism lacking a Multiflex Coupling as illustrated in FIGS. 4A & 4B. Threaded fasteners commensurate with dimensions of a particular Interlace Lifting Mechanism implementation may also be used. The symmetry of the coupling disc 560, sandwiched between and secured to the lifting housing 530 and mounting nut 510, functions as a balanced pair of leaf springs, allowing relative axial movement of the housing and nut while maintaining correct angular and radial location of the traverse bar 532 within the oblong slot 512.

The cross-over plate 520 may be positioned inside the lifting housing 530 against the partially exposed mounting nut 510, and located by the step feature 515 to be astride the traverse bar 532 axial projection and oblong slot 512, as may be appreciated by considering FIG. 5A. In the apparatus 500, a Multiflex Coupling is placed in contact with the cross-over plate 520 and is also engaged with the lifting housing 530. A threaded post feature 521 on the upper surface of the cross-over plate 520 may conveniently fit into a mating threaded hole 579 in the lower reactive element 578 portion of the Multiflex Coupling. The periphery of the upper passive element 575 portion of the Multiflex Coupling, and an associated center disk spring 585, may be held against a shoulder 535 by a locking ring 584 threaded into the lifting housing 530, whereby the passive element 575 and lifting housing 530 remain in located contact with each other and move in unison. The Multiflex Coupling passive element 575 is pierced through by a hole 570 to accommodate an active shaft 580. The lower end 591 of a piezoelectric stack actuator 590 may be placed in contact with the upper active shaft element 580 portion of the Multiflex Coupling. An alignment feature on the upper end of the active shaft 580 may be formed as a hemispherical tipped load concentration pin 581 (or alternatively a conical receptacle and associated spherical bearing) to mate with a suitable conical or similar formed receptacle on the lower end 591 of the piezoelectric stack actuator 590 to accommodate minor actuator misalignment. The active shaft 580 may be centered and prevented from binding with the through hole 570 by use of a disk spring 585 conveniently located against a shoulder formed on the upper end of the active shaft 580. An optional preload spring 588 may be placed between the cross-over plate 520 and the lower reactive element 578, whereby action of the Multiflex Coupling causes the load concentration pin 581 to be urged against the lower end 591 of the piezoelectric stack 590. Such preload spring 588 provides force which is additional to that resulting from the mere zero-clearance adjustment of the mechanism elements, and is particularly useful with piezoelectric actuator stacks. A convenient implementation may comprise a Belleville spring washer 588 interposed between the lower reactive element 578 and the top of the cross over plate 520. One or more shims (not shown) may optionally be placed between the preload spring 588 and the active element 578 for purposes of finely adjusting the added actuator compressing force and these shims may also function as a hardened bearing surface for the preload spring 588 to push against. The active shaft 580 may be made from a heat treatable material such as 17-4PH steel, for example, while the disk spring 585 may be made from the same or other suitable material such as 300 series stainless steel.

The actuator housing 540 may be formed as a circular tube shape having threads 541 to engage mating threads 531 formed on the lifting housing 530. A top capping end 545 may be formed on the upper end of the actuator housing 540 to contact most of the upper end 595 of the piezoelectric stack actuator 590 excepting any electrical connections. Engagement between the actuator housing 540 and the lifting housing 530 may thus be adjusted until the piezoelectric stack 590 is properly captured between the Multiflex Coupling upper active shaft 580 and the top capping end 545. The housing lock nut 550 may then be used to prevent unintended changes of this engagement. The ring-shaped housing lock nut 550 may have one or more inward radial penetrations 553a, 554a, 553b, 554b (passing either partially or fully through the ring wall) that serve as points of engagement for a spanner wrench to help assemble the mechanism. In a similar manner the actuator housing 540 may have one or more inward radial penetrations 551a, 552a, 551b, 552b (passing either partially or fully through the tube wall) that serve as points of engagement for a spanner wrench to help assemble the mechanism. A simple sliding fit between the actuator housing 540 and the lifting housing 530 may be used as an alternative to threads 531, 541 along with other locking means such as pins, crimping, adhesives, or welding which are also contemplated. The actuator housing 540 may be made from materials having a chosen low coefficient of thermal expansion, such as Invar alloys or Molybdenum metal, in applications having potentially problematic temperature variations. One or more annular elastomeric elements 555, 556 such as O-rings may be placed between the actuator periphery and the actuator housing interior to assist with assembly, handling, and mounting.

Operation of the Multiflex Coupling is fully described in U.S. patent application Ser. No. 13/794,517, entitled Multiflex Coupling, as already referenced above. A complete Multiflex Coupling assembly for the instant embodiment includes an upper disk shaped element 575, two rocker elements 576, 577 placed side by side and below the upper disk, and a lower disk shaped element 578 under the rocker elements. A single pivot pin 582 passes through the pivot pin hole of the two semicircular rocker elements and lock pins (four pins 571, 572, 573, 574 being shown in FIG. 5B), to secure the ends of four links within respective axial slots in the several elements. Two links descend from two axial slots of the upper disk shaped element 575 and each link engages a corresponding axial slot in the below adjacent rocker element (the identical rocker elements 576, 577 being mirrored). Two additional links descend from the second axial slot of each rocker element 576, 577, and each link engages a corresponding axial slot in the below adjacent lower disk shaped element 578. In accordance with the embodiment 500 of the inventive mechanism, the upper disk shaped element 575 is made passive and held axially fixed relative to the bulk of the actuator 590 by function of the lifting housing shoulder 535 in conjunction with the locking ring 584 and the top capping end 545 of the actuator housing 540. Extension of the actuator 590 is coupled by the active shaft 580 to move the pivot pin 582 which functions in an active manner, whereby extension of the actuator 590 moves the active pivot pin 582 axially away from the actuator bulk while the reactive lower disk shaped element 578 also extends away from the actuator bulk. The upper end of each rocker element 576, 577 is restrained by the attached link pointing upward from each rocker coupled to the axially fixed upper disk shaped passive element 575, as may be appreciated by considering the lock pins 573, 574 visible in the cross section illustration of FIG. 5B. Axial movement of the actuator 590 displaces the active shaft 580 that passes through the upper disk-shaped passive element 575, and engages the active pivot pin 582, whereby axial movement of the active pivot pin 582 is directly coupled to the rocker elements 576, 577. The illustrated rocker element 576 is thereby caused to slightly rotate about the lock pin 573 of its upward pointing link (not visible) at one end (left) of the illustrated rocker 576 and downward motion of the middle of the illustrated rocker (imparted by the pivot pin 582) results in further downward motion of the other end (right) of the illustrated rocker 576. The downward moving other end of the illustrated rocker 576 is coupled to the reactive lower disk shaped element 578 by the attached downward pointing link (not visible) and its associated lock pins 571, 572. The other rocker 577 is not illustrated in FIG. 5B, due to being located within the mechanism portion that is illustratively removed by creating the sectioned view, but functions in like manner. The reactive lower element 578 translates axially in proportion to motion of the active shaft 580 and in the same direction. The proportionality between motion of the active shaft 580 and motion of the reactive element 578 may be adjusted by choice of the separation between the lock pin holes and the pivot pin hole in the pair of rocker elements 576, 577.

Applying an activation voltage to the piezoelectric stack actuator 590 causes an extensional increase in the actuator length that translates the actuator housing 540 away from the active shaft element 580, which is connected to the pivot pin 582 within the Multiflex Coupling. The actuator housing 540, being in fixed engagement with the lifting housing 530, in combination with the passive element 575 being in fixed contact with the lifting housing shoulder 535, causes the passive element 575 to move relatively away from the pivot pin 582. Relative motion between the pivot pin 582 and passive element 575 cause the rockers 576, 577 to tip slightly and to thereby increase the distance between the reactive element 578 and the passive element 575 by an amount defined by the mechanical gain of the Multiflex Coupling and the actuator extensional length increase. The passive element 575 being axially fixed with the lifting housing 530, while the reactive element 578 contacts the cross over plate 520 resting against the mounting nut 510, thus moves the lifting housing 530 with its traverse bar 532 relative to the mounting nut 510 while deflecting the coupling disc 560. This motion may be observed as a decrease of the clearance 518 between the retaining nut 594 and cross-over plate clearance feature 522, a decrease of the clearance 517 between the top of the traverse bar 532 and the bottom of the cross over plate 520, and an increase of the clearance 516 between the bottom of the traverse bar 532 and the mounting nut 510 as illustrated in FIG. 5B.

Another alternative design using interference fit pins to connect a lifting housing to a coupling disc and the coupling disc to a mounting nut will now be described. This pinned attachment design may be used with a simple interlace Lifting Mechanism as illustrated in FIGS. 1A & 1B, or a more complicated Interlace Lifting Mechanism design incorporating a Multiflex Coupling as illustrated in FIGS. 5A & 5B. The pinned attachment design uses a mounting nut 610 illustrated in FIG. 6A, which is substantially similar to previously shown mounting nuts 10, 510 wherein it is pierced axially by an oblong slot 612 and has on its upper surface a step feature 615 beyond the periphery of the oblong slot 612 to receive and locate a cross over plate (not shown). The pinned attachment design uses a lifting housing 630 as illustrated in FIG. 6B, which is substantially similar to previously shown lifting housings 30, 530 wherein it is formed as a circular shell having an outward axially projecting traverse bar 632 of shape and dimension similar to the oblong slot 612 and extending diametrically across the open lower end 635 of the shell only partially covering the shell open lower end 635. A stem hole 614 may be provided in the traverse bar 632 to facilitate linkage with the moveable portion of the valve. The open lower end 635 of the shell includes a lip 637 for convenience in making the shell and traverse bar from a single piece of material. In the case of this alternative lifting housing design, the lip 637 has two diametrically opposite blind bores 642, 644 to receive attachment pins 672, 674 and two diametrically opposite reliefs 641, 643 cut into the lip 637, providing head clearance for similar pins 671, 673 pointed in the opposite axial direction. Similarly, the pinned attachment mounting nut 610 has cut into the underside two diametrically opposite blind bores 621, 623 to receive attachment pins 671, 673 and two diametrically opposite reliefs 622, 624 cut into the underside providing head clearance for the opposing pins 672, 674.

The pinned attachment design lifting housing 630 is connected to a coupling disc 660 (detailed in FIG. 6C) and the coupling disc 660 is connected to the mounting nut 610 thereby locating the traverse bar 632 projection within the oblong slot 612. The coupling disc 660 may be formed as a flat ring-shaped spring with radially directed diametrically opposite (inward directed being more convenient but not limiting) tabs 661, 662, 663, 664 having corresponding pin accommodating through holes 666, 667, 668, 669 as illustrated in FIG. 6C. The attachment connections are effected by pins 671, 672, 673, 674, with low profile heads being inserted into the coupling disc tab through holes 666, 667, 668, 669 and the pin bodies forced into interference fit within the corresponding blind bores 621, 623, 642, 644 of the mounting nut and lifting housing. The illustrations show a smooth shank on the pins and a smooth blind bore but designers will appreciate the feasibility of using grooved or serrated pins, serrated blind bores, and other known methods of achieving a desirable tight mechanical connection.

Figure 7A:
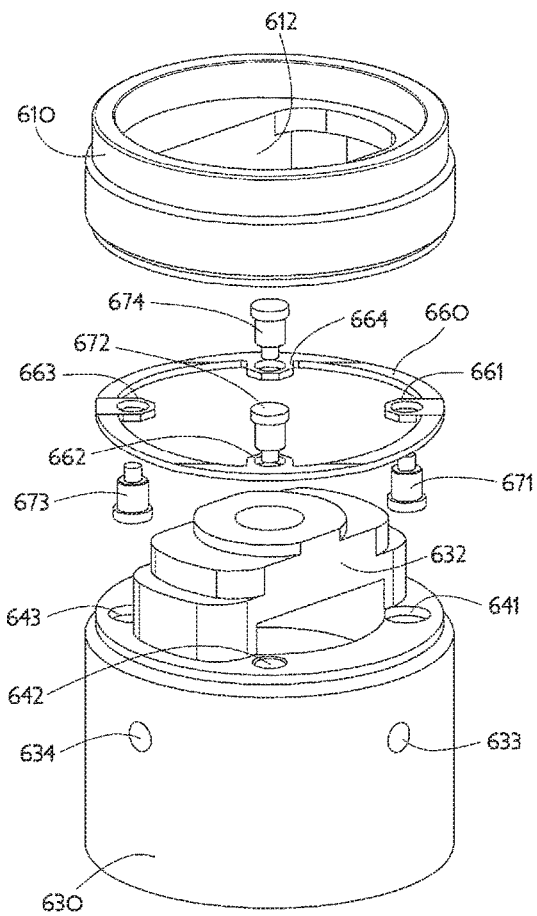
FIG. 7A is an exploded view of the inverted stack of the modified lifting housing, coupling disc, and mounting nut of FIGS. 5A-6C, with connection pins to be inserted.
Figure 7B:
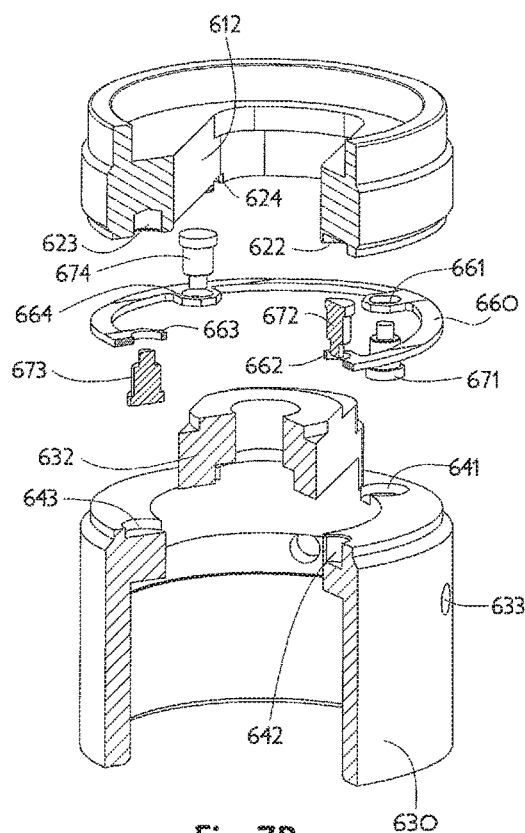
FIG. 7B is an exploded view of the embodiment of FIG. 7A with a quarter segment section removed to reveal the relationship of pin receiving features.
Figure 7C:
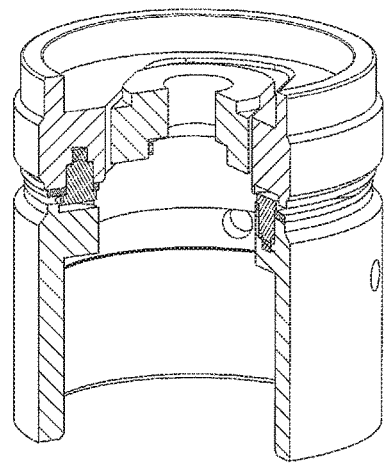
FIG. 7C is an assembled view of the embodiment as shown FIG. 7B.
Figure 8C:
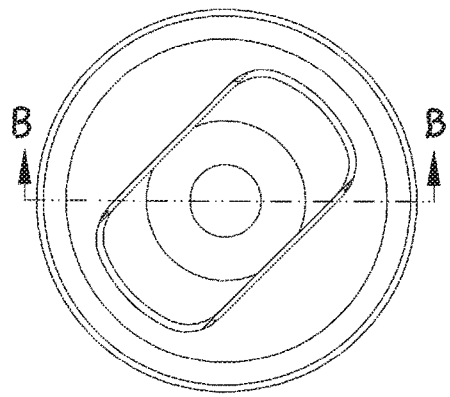
FIG. 8C is a top view of the apparatus shown in FIGS. 8A and 8B.
Figure 8A:
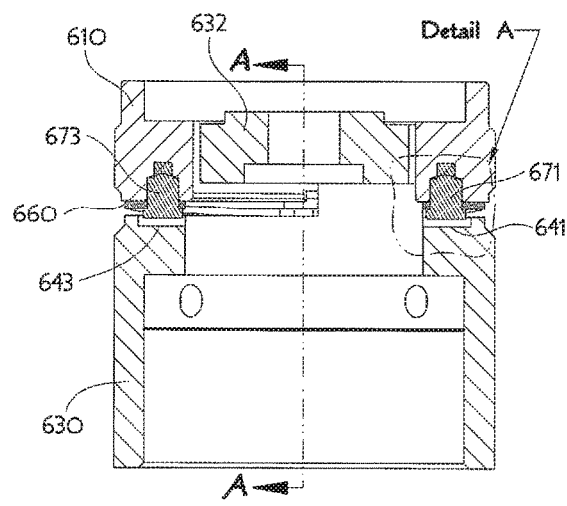
FIG. 8A is a cross-sectional view through the inverted stack of lifting housing, coupling disc, and mounting nut of the alternative embodiment of FIGS. 5A-7C, taken along lines B-B of FIG. 8C, showing the pinned attachment of the coupling disc and mounting nut.
Figure 8B:
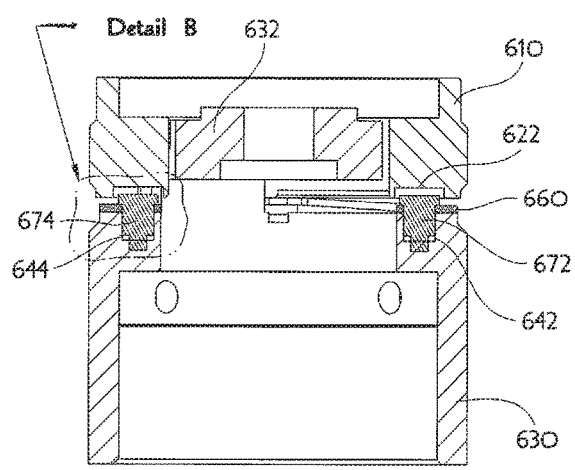
FIG. 8B is a cross-sectional view through the inverted stack of lifting housing, coupling disc, and mounting nut of the alternative embodiment of FIGS. 5A-8A, showing the pinned attachment of the coupling disc and lifting housing.
Figure 8D:
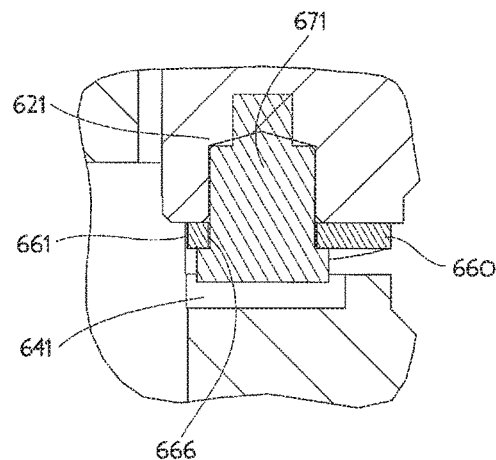
FIG. 8D is an enlarged cross-sectional view of the portion of FIG. 8A identified as DETAIL A.
Figure 8E:
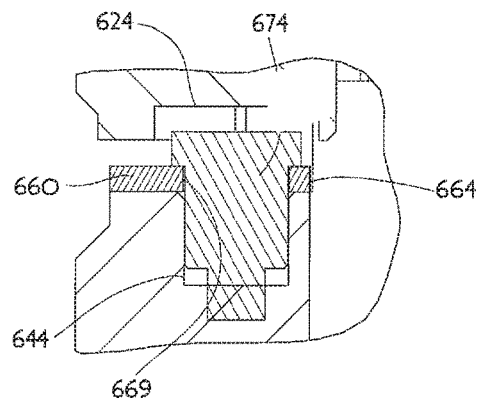
FIG. 8E is an enlarged cross-sectional view of the portion of FIG. 8B identified as DETAIL B.

In a typical manufacturing sequence, the lifting housing shell 630, the coupling disc 660, and the mounting nut 610 are inverted and stacked in angular alignment as illustrated in FIGS. 7A, 7B, & 7C. The lifting housing 630 would first he positioned, then a first pair of pins 671, 673 projecting upward would be placed head down into the reliefs 641, 643; next the coupling disc 630 would be placed over the first pair of pins 671, 673 with those pins projecting upward through a first pair of opposite tabs 661, 663; then a second pair of pins 672, 674 would be inserted downward through the second pair of opposite tabs 662, 664 and starting to enter the pair of housing blind bores 642, 644; then the mounting nut 610 would be aligned so the oblong slot 612 accommodates the traverse bar 632 and the pair of underside blind bores 621, 623 begin to engage the upward projecting first pair of pins 671, 673. The connection of the pieces in the stacked assembly would next be completed by applying axial compression force urging the housing 630 and mounting nut 610 together thereby forcing the pins 671, 672, 673, 674 into the corresponding blind bores 621, 623, 642, 644. It is also feasible to use a light press fit between the tab through holes 666, 667, 668, 669 and the pins 671, 672, 673, 674, allowing the pins to be inserted into the coupling disc 660 and handled as a single subassembly item. The cross-sectional illustrations of FIGS. 8A & 8B further reveal the first pair of pins 671, 673 attaching the coupling disc 660 to the mounting nut 610 and the second pair of pins 672, 674 attaching the coupling disc 660 to the housing 630.

Having thus described several aspects of this invention, it is to be appreciated that various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A mechanism for coupling motion of an actuator, the mechanism being adapted to surround the actuator and to contact opposite ends of the actuator, whereby an extension motion in an extension direction lengthening the actuator causes a lifting portion of the mechanism to translate toward a bulkier portion of the actuator while a mounting nut of the mechanism remains at a fixed location, wherein the lifting portion comprises a lifting portion housing, the lifting portion housing comprises a traverse bar that is linked with a central shaft integrally formed and coupled with a valve, the traverse bar provided with a hole in which the central shaft is accommodated, and the traverse bar is positioned in an oblong slot formed in the mounting nut.

2. The mechanism as recited in claim 1, wherein the mechanism comprises a cross-over plate arranged between the lifting portion and the mounting nut.

3. The mechanism as recited in claim 1, wherein the traverse bar is arranged between the mounting nut and the central shaft along a direction which is vertical to the extension direction.

4. The mechanism as recited in claim 1, wherein the lifting portion housing is linked with the central shaft by screwing a retaining nut to the central shaft.

5. The mechanism as recited in claim 1, wherein a diaphragm and the traverse bar are configured to move together according to an expansion and a contraction of the actuator.

6. The mechanism as recited in claim 1, wherein the central shaft is configured to pull up a center of a diaphragm.

* * * * *